United States Patent [19]

Moroto et al.

[11] Patent Number: 4,914,978
[45] Date of Patent: Apr. 10, 1990

[54] AUTOMATIC TRANSMISSION

[75] Inventors: Shuzo Moroto, Handa; Masakatsu Miura, Kariya; Masahiko Ando, Okazaki, all of Japan

[73] Assignee: Aisin-Warner Kabushiki Kaisha, Anjo, Japan

[21] Appl. No.: 127,331

[22] Filed: Dec. 1, 1987

[30] Foreign Application Priority Data

Dec. 9, 1986 [JP] Japan .................................. 61-293665

[51] Int. Cl.$^4$ ...................... F16H 37/08; F16H 37/00
[52] U.S. Cl. ..................................... 475/71; 475/205; 475/206; 475/281
[58] Field of Search .................. 74/760, 761, 695, 701, 74/740

[56] References Cited

U.S. PATENT DOCUMENTS

| 2,827,805 | 3/1958 | Miller | 74/761 |
| 2,890,603 | 6/1959 | Harris et al. | 74/760 |
| 2,894,415 | 7/1959 | Miller | 74/761 X |
| 3,264,902 | 8/1966 | Breting et al. | 74/740 X |
| 3,381,546 | 5/1968 | Holl | 74/761 |
| 3,877,320 | 4/1975 | Iijima | 74/761 X |
| 4,393,731 | 7/1983 | Croswhite et al. | 74/695 X |
| 4,624,154 | 11/1986 | Kraft et al. | 74/695 |
| 4,711,138 | 12/1987 | Miura et al. | 74/761 |
| 4,716,787 | 1/1988 | Miura et al. | 74/701 X |
| 4,722,242 | 2/1988 | Miura et al. | 74/701 X |

FOREIGN PATENT DOCUMENTS 2023752  1/1980  United Kingdom .................. 74/761

Primary Examiner—Rodney H. Bonck
Assistant Examiner—Harold F. Macris
Attorney, Agent, or Firm—Kanesaka and Takeuchi

[57] ABSTRACT

An automatic transmission has a main transmission mechanism having two planetary gear units made on a first axle, and a sub transmission mechanism having two planetary gear units made on a second axle; the main transmission mechanism having a single planetary gear unit and dual planetary gear unit, carriers of the gear units being connected to one another and sun gears of the gear units being connected one another, an input member connecting a ring gear of the single planetary gear unit through a first clutch, and connecting a sun gear through a second clutch, a brake restraining the sun gear and a ring gear of the dual planetary gear unit at a required moment; the main transmission mechanism having three forward speeds and one reverse speed. A fourth clutch may be added which connects an input shaft and the ring gear of the dual planetary gear unit, so that four forward speeds and one reverse speed are obtained. The sub transmission mechanism has three forward speeds.

17 Claims, 7 Drawing Sheets

FIG.2

|      | $C_1$ | $C_2$ | $B_1$ | $B_2$ | $B_3$ | $F_1$ | $F_2$ |
|------|-------|-------|-------|-------|-------|-------|-------|
| 1ST  | ○     |       |       |       | △     |       | ○     |
| 2ND  | ○     |       | △     | ○     |       | ○     |       |
| 3RD  | ○     | ○     |       | ○     |       |       |       |
| REV  |       | ○     |       |       | ○     |       |       |

FIG.3

|      | $C_3$ | $B_4$ | $B_5$ | $B_6$ | $F_3$ | $F_4$ |
|------|-------|-------|-------|-------|-------|-------|
| 1ST  |       | △     |       |       | ○     |       |
| 2ND  |       |       | △     | ○     |       | ○     |
| 3RD  | ○     |       |       |       |       |       |

FIG.5

|      | $C_1$ | $C_2$ | $C_0$ | $B_1$ | $B_2$ | $B_3$ | $F_1$ | $F_2$ | $F_0$ |
|------|-------|-------|-------|-------|-------|-------|-------|-------|-------|
| 1ST  | ○     |       |       |       |       | △     |       | ○     |       |
| 2ND  | ○     |       |       | △     | ○     |       | ○     |       |       |
| 3RD  | ○     |       | ○     |       | ○     |       |       |       | ○     |
| 4TH  |       |       | ○     | ○     | ○     |       |       |       |       |
| REV  |       | ○     |       |       |       | ○     |       |       |       |

FIG. 7

| POSITION | MAIN TRANSMISSION MECHANISM | | | | | | | SUB TRANSMISSION MECHANISM | | | | | |
|---|---|---|---|---|---|---|---|---|---|---|---|---|---|
| | $C_1$ | $C_2$ | $B_1$ | $B_2$ | $B_3$ | $F_1$ | $F_2$ | $C_3$ | $B_4$ | $B_5$ | $B_6$ | $F_3$ | $F_4$ |
| P |  |  |  |  |  |  |  | O |  |  |  |  |  |
| R |  | O |  | O |  |  |  | O |  |  |  |  |  |
| N |  |  |  |  |  |  |  |  |  |  |  |  |  |
| 1ST | O |  |  |  | △ |  | O |  | △ |  |  | O |  |
| 2ND | O |  |  |  | △ |  | O |  |  | △ | O |  | O |
| 3RD | O |  | △ | O |  | O |  |  |  | △ | O |  | O |
| 4TH | O |  | △ | O |  | O |  | O |  |  |  |  |  |
| 5TH | O | O |  | O |  |  |  | O |  |  |  |  |  |

FIG. 9

| POSITION | MAIN TRANSMISSION MECHANISM | | | | | | | | | SUB TRANSMISSION MECHANISM | | | | | |
|---|---|---|---|---|---|---|---|---|---|---|---|---|---|---|---|
| | $C_1$ | $C_2$ | $C_0$ | $B_1$ | $B_2$ | $B_3$ | $F_1$ | $F_2$ | $F_0$ | $C_3$ | $B_4$ | $B_5$ | $B_6$ | $F_3$ | $F_4$ |
| P |  |  |  |  |  |  |  |  |  | O |  |  |  |  |  |
| R |  | O |  |  | O |  |  |  |  | O |  |  |  |  |  |
| N |  |  |  |  |  |  |  |  |  |  |  |  |  |  |  |
| 1ST | O |  |  |  |  | △ | O |  |  |  | △ |  |  | O |  |
| 2ND | O |  |  |  |  | △ |  |  |  |  |  | △ | O |  | O |
| 3RD | O |  |  | △ | O |  | O |  |  |  |  | △ | O |  | O |
| 4TH | O |  |  | △ | O |  | O |  |  | O |  |  |  |  |  |
| 5TH | O |  | O |  | O |  |  |  | O | O |  |  |  |  |  |
| 6TH |  |  | O | O |  |  |  |  |  | O |  |  |  |  |  |

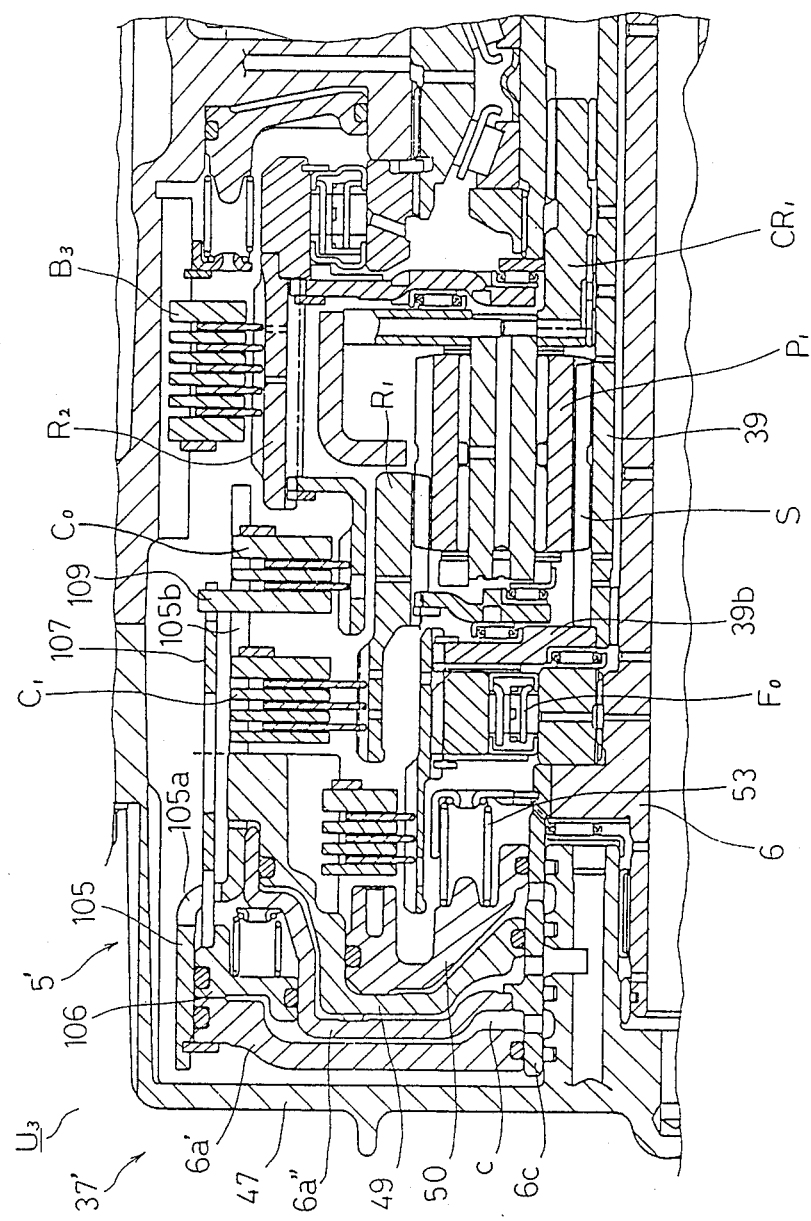

AUTOMATIC TRANSMISSION

BACKGROUND OF THE INVENTION

1. Field of the Invention

The present invention relates to an automatic transmission used with a torque converter for an automobile, particuraly to a multipule speed automatic transmission comprising a main transmission mechanism and a sub transmission mechanism.

2. Description of the Prior Art

An automatic transmission, in general, has four forward speeds and one reverse speed by a combination of a three-speed automatic transmission mechanism comprising two planetary gear units, and an over drive mechanism or an under drive mechanism having one planetary gear unit.

Transmissions having more speeds than now have been required recently to attain higher fuel efficiency and faster acceleration, etc. Under such circumstances, an automatic transmission accomplishing more than five speeds in forward by adding a three-speed sub transmission mechanism is proposed.

Said multiple speed automatic transmission comprises a torque converter and Simpson type planetary gear unit on a first axle; same type of Simpson type planetry gear unit on a second axle, so that five forward speeds are obtained.

Due to the recent trend of so-called "front engine and front drive" and varities of automobiles, an automatic transmission has been required to be small in size and to be assembled by using parts and manufacturing process in common to get more multiple speeds in mechanism.

However, certain prior art shows that in case of obtaining a six speed automatic transmission, a four speed gear mechanism has to be installed on a first axle. Due to the above, the first axle becomes long, so that installation problems particulary in "front engine and front drive" cars may occur. Also, another gear mechanism which is quite different from Simpson type has to be used. This means that parts and manufacturing prosess are not utilized in common.

Then, in the present invention, a newly designed planetary gear mechanism which can be obtained by slight modification of third and fourth speeds is used to make the size of mechanism shorter in axial direction, and to use the parts in common to cope with wide variation of automobiles: a multiple automatic transmission is obtained.

SUMMARY OF THE INVENTION

While the invention is believed to be readily understood from the above description, a brief summary will now be set forth.

As the explanation will be provided in accordance with FIG. 1 and FIG. 4, a main transmission mechanism (5), (5') comprising two planetary gear units (1), (2) is installed on a first axle (6); a sub transmission mechanism (9) comprising two planetary gear units (7), (8) is installed on a second axle (10) which is parallel to the first axle.

Said main transmission mechanism (5) having three forward speeds and one reverse speed, as shown in FIG. 1, comprises said single planetary gear unit (1) and said dual planetary gear unit (2); carriers (CR$_1$) of both planetary gear units are connected to one another; sun gears (S$_1$) are connected to one another; an input member (6a) is connected to a ring gear (R$_1$) of said single planetary gear unit through a first clutch (C$_1$), and is connected to the sun gear (S$_1$) through a second clutch (C$_2$); said sun gear (S$_1$) and said ring gear (R$_2$) of the dual planetary gear unit are restrained by a restraining means at the required moment; said carrier (CR$_1$) is connected to an input portion (12) of said sub transmission mechanism (9).

Said sub transmission mechanism (9) comprising two single planetary gear units (7), (8) has three forward speeds.

Further explanation is given in the concrete, wherein a restraining means of the sun gear (S$_1$) of the main transmission mechanism (5) is a first brake (B$_1$) restraining the sun gear (S$_1$) directly, and a second brake (B$_2$) regulating one way rotation through a one-way clutch (F$_1$); the restraining means of the ring gear (R$_2$) of said dual planetary gear unit comprises a third brake applying direct braking to said ring gear (R$_2$), and a second one-way (F$_2$) clutch regulating one way rotation of said ring gear (R$_2$).

On the single planetary gear units (7), (8) of said sub transmission mechanism, sun gears (S$_2$) (Sc, Sd) are connected to one another; a carrier (CR$_2$) of said planetary gear unit (7) and a ring gear (R$_4$) of said planetary gear unit (8) are connected and the carrier (CR$_2$) is also connected to an output member (13); a ring gear (R$_3$) of said planetary gear unit (7) is connected to an output portion (11) of said main transmission mechanism (5); a carrier (CR$_3$) of said planetary gear unit (8) is restrained at the required moment by a restraining means, i.e., a fourth brake (B$_4$) applying brake directly to said carrier (CR$_3$) and a third one-way clutch (F$_3$) regulating one way rotation of said carrier (CR$_3$); said carrier (CR$_3$) and the sun gear (S$_2$) are connected by a third clutch (C$_3$) at the required moment; said sun gear (S$_2$) is restrained at the required moment by a restraining means, i.e., a fifth brake (B$_5$) applying brake directly to said sun gear (S$_2$) and a sixth brake (B$_6$) regulating one way rotation of said sun gear (S$_2$) through a fourth one-way clutch (F$_4$).

On the other hand, in said main transmission mechanism (5') having four forward speeds and one speed, as shown in FIG. 4, for reference, said input member (6a) is connected to said ring gear (R$_2$) of said dual planetary gear unit (2) through a fourth clutch (C$_0$) in addition to said three speed transmission mechanism (5).

Furthermore, it is desirable to place a fifth one-way clutch (F$_0$), between said input member (6a) and the sun gear (S$_1$), for regulating rotation of said sun gear (S$_1$) not to exceed the rotation of said input member (6a).

In an automatic transmission (U$_2$) using said four speed transmission mechanism (5'), said sub transmission mechanism (9) is identical with an automatic transmission (U$_1$) using said previous three speed transmission mechanism (5).

Due to the above explanation, said three speed main transmission mechanism (5) operates as shown in FIG. 2.

At first speed of D range, said first clutch is connected. Then, the rotation of said input member (6a) (first axle 6) is transmitted to said ring gear (R$_1$) of said single unit (1); under this condition, as the rotation of said ring gear (R$_2$) of the dual unit (2) is retrained by the second one way clutch (F$_2$), the rotation of said input member (6a) rotates the sun gear (S$_1$) in reverse without load, and the carrier (CR) rotates in normal direction with greatly reduced rotation; this rotation is taken from said output portion (11) (gear) and transmitted to said sub transmission mechanism (9).

At second speed of D range, the second brake ($B_2$) works in addition to the connection of said first clutch ($C_1$). Then, said sun gear ($S_1$) is restrained by the motion of said first one-way clutch ($F_1$) based on said second brake ($B_2$), so that, the rotation of said ring gear ($R_1$) transmitted said input member (6a) makes said ring gear ($R_2$) of said dual unit (2) rotate in positive direction without load, and makes said carrier ($CR_1$) rotate in positive direction with reduced rotation; this rotation is taken from said output portion (11) as second speed.

At third speed of D range, said second clutch ($C_2$) (direct) is connected in addition to the connection of said first clutch ($C_1$) (forward). The rotation of said input member (6a) is transmitted to said ring gear ($R_1$) and said sun gear ($S_1$); said planetary gear units (1), (2) rotate together, consequently, said carrier ($CR_1$) rotates together and this rotation which is the same rotation speed as said input member (6a) is taken from said output portion (11).

At this time, if said second brake ($B_2$) is released before the connection of said second clutch ($C_2$), speed condition backs to the first speed; then, said second brake ($B_2$) is released after the connection of said second clutch ($C_2$), or kept connecting. Furthermore, at reverse (R) range, said second clutch ($C_2$) and the third brake ($B_3$) (1st. reverse) work. Then, the rotation of said input member (6a) is transmitted to the sun gear ($S_1$) through said second clutch ($C_2$); under this condition, as said ring gear ($R_2$) of said dual unit (2) is fixed, the rotation of said input member (6a) makes said ring gear ($R_1$) of said single unit (1) rotate in reverse direction and does said carrier ($CR_1$) in reverse direction, and this reverse rotation of the carrier ($CR_1$) is taken up from said output portion (11).

At coasting of 1 and 2 ranges, said third brake ($B_3$) works in addition to the condition of the first speed of D range; consequently, at an engine brake application (reversal of input and output), transmission is disconnected by said second one-way clutch ($F_2$) in D range. However, in coasting, said ring gear ($R_2$) is fixed by said third brake ($B_3$), so, first speed condition is maintained.

At second speed, said first brake ($B_1$) (2nd coast brake) works in addition to the second speed condition of D range. Due to this, while the engine brake is applied, the rotation without load comes out by said one way clutch ($F_1$) in D range, and in 2 range, said sun gear (S) is fixed by said first brake ($B_1$), so that second, speed condition is maintained.

On the other hand, said sub transmission mechanism (9) works as shown in the operation table of FIG. 3: at first speed, each brake ($B_4$), ($B_5$), ($B_6$) and said clutch ($C_3$) have no function. Under this condition, the rotation of said input shaft (12) given from said main transmission mechanism (5) is transmitted to said ring gear ($R_3$) of said planetary gear unit (7), this rotation is transmitted to said carrier ($CR_2$) through said pinion ($P_3$), and transmitted to said planetary gear unit (8). At this time, as said carrier ($CR_3$) of said planetary gear unit (8) is restrained by said third one-way clutch ($F_3$), said pinion ($P_4$) self-rotates due to the rotation of said sun gear ($S_2$), and the rotation of said ring gear ($R_4$) together with the rotation of said carrier ($CR_3$) is transmitted to said output member (13).

At second speed, said sixth brake ($B_6$) works. Then, said sun gear ($S_2$) is restrained by said fourth one-way clutch ($F_4$), and the rotation of said ring gear ($R_3$) of said gear unit (7) is transmitted to said carrier ($CR_2$) with predetermined reductive gear ratio, and is transmitted to said output member (13).

At third speed, said third clutch ($C_3$) is connected, and said sun gear ($S_2$) and said carrier ($CR_3$) of said gear unit (8) are connected to one another. The components of said gear unit (8) are locked together, so that accordingly, the components of said gear unit (8) are also locked together. Under this condition, the rotation of said ring gear ($R_3$) is taken up from said carrier ($CR_2$) which is connected together with said ring gear ($R_3$) and is transmitted to said output member (13).

At first speed of coasting, said fourth brake ($B_4$) works, whereby non-function of engine brake is prevented due to no-load rotation of said one way clutch ($F_3$) at coasting, and at second speed, said fifth brake ($B_5$) works, whereby non-function of engine brake is prevented due to non-load rotation of said fourth one-way clutch ($F_4$).

Said main transmission mechanism (5) having three forward speeds and one reverse speed and said sub transmission mechanism (9) having three forward speeds are combined, so that said automatic transmission ($U_1$) having five forward speeds or the automatic transmission made up from the combination of said main transmission mechanism (5) and said sub transmission mechanism (9) (maximum 9 speeds).

On the other hand, explanation is given to said four speed automatic transmission mechanism (5') in accordance with FIG. 5. The explanation of R range, coasting, first and second speeds of D range is eliminated because they are the same as those of said forward three speeds automatic transmission mechanism (5).

At third speed of D range, said fourth clutch ($C_0$) is connected in addition to said first clutch ($C_1$). The rotation of said input member (6) is transmitted to said ring gear ($R_1$) of said single unit (1) through said clutch ($C_1$) and said ring gear ($R_2$) of said dual unit (2). Consequently, the components of both said planetary gear units rotate together, and the same rotation is transmitted to said input member (6) from said carrier ($CR_1$). At this time, said second brake ($B_2$) keeps restraining condition till said fourth clutch ($C_0$) is connected to prevent second speed condition from stepping down to first speed; said clutch ($C_0$) is completely and the components of both planetary gear units rotate together; under this condition, the rotation of said fifth one-way clutch ($F_0$) is synchronized.

At fourth speed said first clutch is disconnected and said first brake ($B_1$) works. Then, the rotation of said input member (6) is transmitted to said ring gear ($R_2$) of said dual unit (2) through said fourth clutch ($C_0$). Under this condition, as said sun gear ($S_1$) is restrained, said single unit ring gear ($R_1$) rotates faster with no-load while said carrier ($CR_1$) also rotates faster, and this faster rotation, as over drive, is transmitted to said output portion (11). At the time of shifting up from third to fourth speed, said first clutch ($C_1$) is disconnected before said first brake ($B_1$) works, based on the structure to prevent said sun gear (S) from increasing its rotation speed by said one-way clutch ($F_0$), and this gives time to motion of restraint of said first brake ($B_1$), and makes motion timing easy, and avoids shift shock of gear change, so that shifting becomes smooth. Furthermore, this time, said second brake ($B_2$) and said first one-way clutch ($F_1$) may be connected. At the time of shifting down from fourth to third speed, by the existance of said fifth one-way clutch ($F_0$), the rotation of said sun gear ($S_1$) is prevented from exceeding, in positive direction, that of said input member (6) due to disconnection of said first brake ($B_1$); is given to the connection of said first clutch ($C_1$), motion timing becomes easy and shift shock by gear change is prevented, so that shifting becomes smooth.

Then, said main transmission mechanism (5') having four forward speeds and one speed, and said sub transmission mechanism (9) having three forward speeds are combined selectively; said automatic transmission ($U_2$) having six forward speeds, or the automatic transmission of the combination of said main transmission mechanism (5') and said sub transmission mechanism (9) (maximum twelve speeds) is obtained.

All numbers and symbols in parentheses in "SUMMARY OF THE INVENTION" are for reference purpose and do not define claims.

BRIEF DESCRIPTION OF DRAWINGS

FIG. 2 is a table of operation of said automatic transmission shown in FIG. 1;

FIG. 3 is a table of operation of a sub transmission of said automatic transmission of FIG. 1;

FIG. 5 is a table of operation of said automatic transmission shown in FIG. 4;

FIG. 7 is a table of operation of each component;

FIG. 9 is a table of operation of each component of the mechanism shown in FIG. 8; and FIG. 10 is a cross sectional view of a partially modified embodiment.

DESCRIPTION OF THE PREFERRED EMBODIMENT

Figure 1:
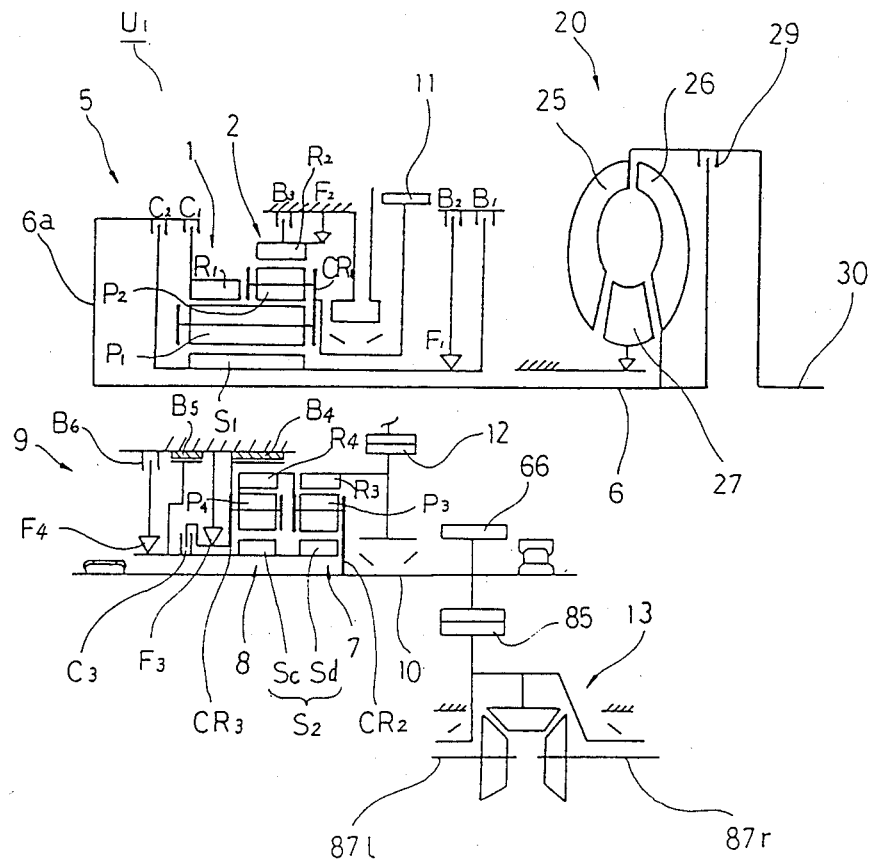
FIG. 1 is a schematic view of an automatic transmission related to the first invention.
Figure 4:
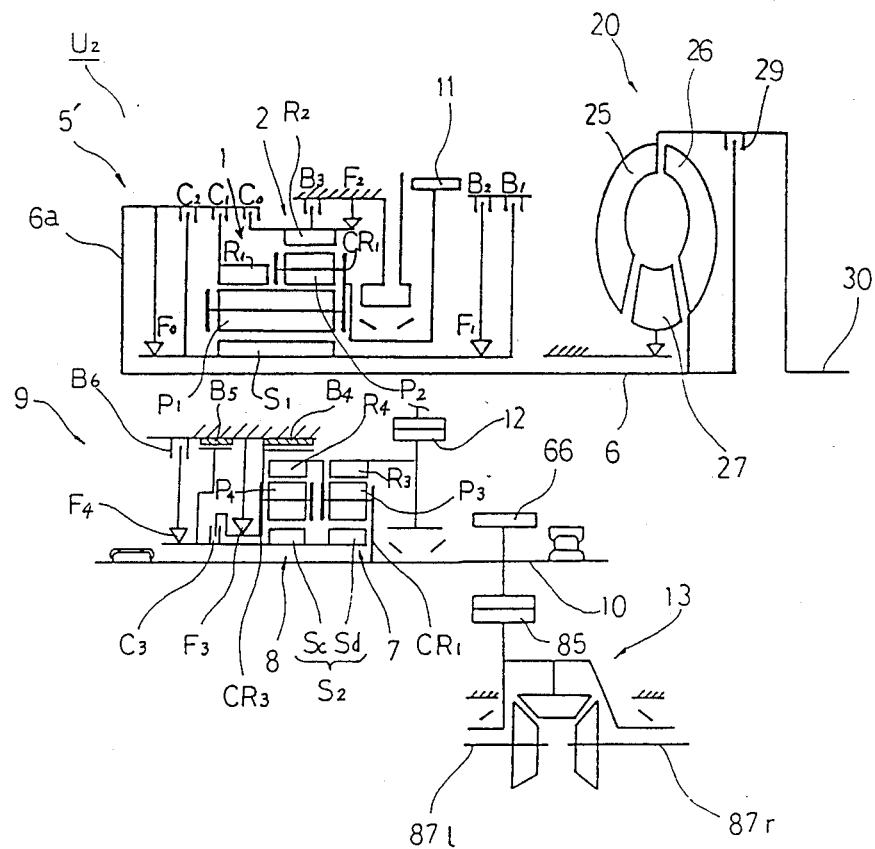
FIG. 4 is a schematic view of an automatic transmission related to the second invention.
Figure 6:
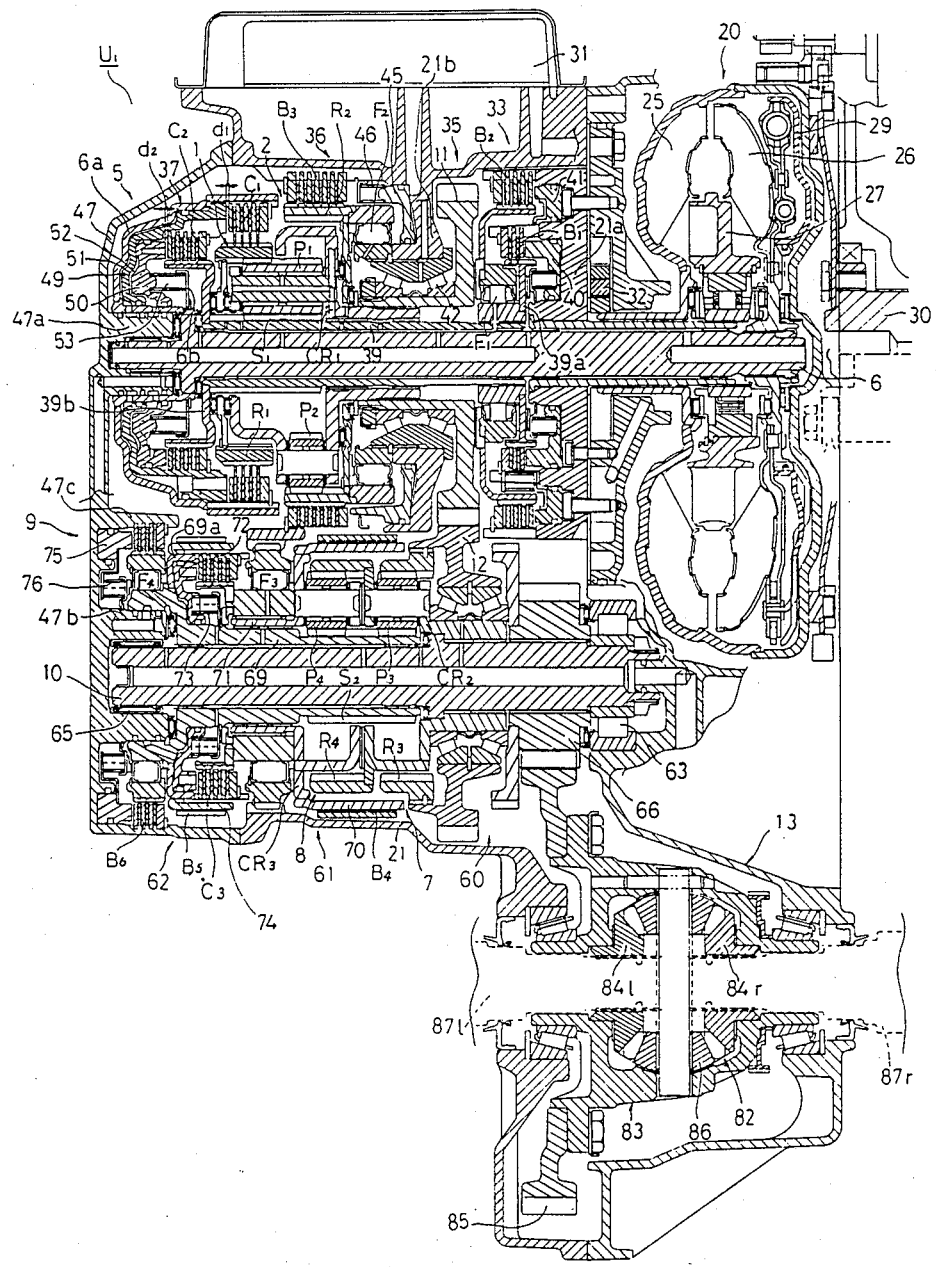
FIG. 6 is a cross sectional view of the embodiment of the first invention.

An embodiment of the first invention is explained below an automatic transmission $U_1$ having five forward speeds, as shown in FIG. 1 and FIG. 6, comprises a torque converter 20, main automatic transmission mechanism 5, sub transmission mechanism 9 and differential 13 for constituting an output member which are contained in a case 21 comprising a transaxle housing, a transaxle case and a transaxle cover. Said torque converter, comprising an impeller 25, a turbine 26, a reactor 27 and a lock-up clutch 29, transmits driving force to said main transmission mechanism from an engine crank shaft 30 through oil flow in said torque converter 20 or a mechanical connection of lock-up clutch 29. In said case 21, said first axle 6 is located with said crank shaft 30 in series and said second axle is free rotationally supported parallel to said first axle 6; a valve body 31 is located on the upper part of said case 21; an oil pump 32 is installed between said automatic transmission mechanism 5 and said torque converter 20.

On said main transmission 5, a brake portion 33, an output portion 35, a planetary gear unit portion 36 and a clutch portion 37 are located in this sequence toward outside from said oil pump 32, and further, a hollow shaft 39 which rotates freely encloses said first shaft 6.

Said planetary gear unit portion 36 comprises single gear unit 1 and dual gear unit 2; said single gear unit comprises sun gear $S_1$ which is a long gear made on said hollow shaft 39, ring gear $R_1$ and carrier $CR_1$ supporting pinion $P_1$ which meshes said sun gear $S_1$ and said ring gear $R_1$; said dual gear unit 2 comprises said sun gear $S_1$ used in common, ring gear $R_2$ and said common carrier CR supporting said pinion $P_1$ meshing said sun gear $S_1$ and said pinion $P_2$ meshing said ring gear $R_2$. Thus said both unit 1,2 comprises common gears made on hollow shaft 39, said carrier $CR_1$ being connected to one another as common carrier, and said pinion $P_1$ is a long pinion.

Said brake portion 33 comprises, from inner toward outer diameter direction, first one-way clutch $F_1$, first brake $B_1$ and second brake $B_2$; hydraulic actuators 40, 41 are located near each brake and along diameter direction on case 21a connected with a case of said oil pump 32. Said first brake $B_1$ is located between a flange 39a at the edge of said hollow shaft 39 and a fin expanded from said pump case 21a; said second brake $B_2$ is located between a flange expanded from an outer race of said first one-way clutch $F_1$ and an expanded portion of said pump case 21a; said one-way clutch $F_1$ is located between said hollow shaft 39 and said first brake $B_1$.

On the other hand, said output portion 35 has a counter drive gear 11 which is supported by a bearing 42 on a separator 21b made on said axle case 21, and said counter drive gear 11 is connected to said carrier through a spline. Further, an outer race of said bearing 42 is fixed on said separator 21b, is unable to rotate and is expanded toward an axial direction; said one-way clutch $F_2$ is located between said expanded portion of said outer race of bearing 42 and a connecting portion connected with said ring gear $R_2$. Said third brake is located between an outer surface of said ring gear $R_2$ and said axle case 21, and a hydraulic actuator 45 is located on one side of said separator 21b; a piston of said actuator 45 expands axially like fins of a comb, and controls said third brake and a return spring 46 is installed on such comb fins.

And clutch portion 37 comprises first clutch $C_1$ (forward) and second clutch $C_2$ (direct), is located at the top edge of said main transmission 5 and housed in transaxle cover portion 47 making up said case 21. At the top edge of said first axle 6, a flange 6a encloses a boss 47a made on said axle cover portion 47; a movable member 49 is inserted in said flange 6a, and a piston member 50 is inserted in said piston member 49. Said movable member 49 makes an oil chamber 51 between an inner diameter portion of said member 49 and said flang 6a; an outer portion of said member 49 is connected to said flange 6a to prevent only relative rotation and has a small slit $d_1$ against said first clutch $C_1$ to make up a hydraulic actuator of said first clutch $C_1$.

On the other hand, said piston member 50 makes an oil chamber 52 between said movable member 49 and the piston member 50 and has small slit $d_2$ against said second clutch $C_2$ to make up a hydraulic actuator of said second clutch $C_2$.

Furthermore, a spring 53 is installed between said piston member 50 and a ring 6b fixed on said first axle 6 so that said spring 53 works as a common return spring for both said piston members 49, 50 of said hydraulic actuators of said first and second clutches $C_1$, $C_2$. Said first clutch $C_1$ is located between an inner surface of said flange 6a and an outer circumference of said ring gear $R_1$ of said single unit 1; said second clutch $C_2$ is located between an inner circumference of said movable member 49 and a flange 39b connected on the top edge of said hollow shaft 39.

On said sub transmission mechanism 9, a gear portion 60, a planetary gear unit portion 61 and control portion 62 are installed in this sequence in axial direction of said second axle 10, and said second axle 2 is free rotationally supported by a bearing 63, 65 in said case 21 (47).

Said gear portion 60 is fixed on said second axle 10 and comprises a differential pinion 66 transmitting driving force to a differential 13, and a counter driven gear 12 supported by bearing to said second axle 10 and meshing said counter drive gear 11.

On said planetary gear unit portion 61, two planetary gear units 7, 8 are located closely and said ring gear $R_3$ of said planetary gear unit 7 is connected to said counter driven gear 12. Further, a carrier $CR_2$ supporting a pinion $P_3$ of said planetary gear unit 7 is connected to a ring gear $R_4$ of another planetary gear unit 8, and another end expands like boss and is connected to said second axle 10 by spline. Said second axle 10 in the area of said gear portion 61 is free rotationally enclosed by a hollow shaft 69 and said sun gear $S_2$ for both gear units 7, 8 is made on said hollow shaft 69. A carrier $CR_3$ supporting a pinion $P_4$ of said planetary gear unit 8 fixes a brake drum 70 on the outer diameter side of said carrier $CR_3$; a fourth brake $B_4$ (band brake) is connected to said drum 70.

And said control portion 62 has third one-way clutch $F_3$, third clutch $C_3$, fourth one-way clutch $F_4$, fifth brake $B_5$ and sixth brake $B_6$. On said third one-way clutch $F_3$, an inner race is connected to a boss 71 which expands from said carrier $CR_3$ of said gear unit 8 and free rotationally encloses said hollow shaft 69 an outer race is located and is connected to said case 21. At the top edge of said hollow shaft 69, an diameter increases in step-like manner to enclose a boss 47b and a flange 69a is fixed. Third clutch $C_3$ is located between an inner diameter side of said flange 69a and a hub expanded from said boss 71 of said carrier $CR_3$; a hydraulic actuator 72 of said clutch $C_3$ is located at an inner circumference of said flange 69a and is movable axially against a force of a return spring 73. A brake band 74 is fixed an outer diameter side of said flange 69a and is connected to said fifth brake $B_5$ which is made up of band brakes. Further, said one-way clutch $F_4$ is located at the outer diameter side of said hollow shaft 69; said sixth brake $B_6$ is located between an outer race of said one-way clutch $F_4$ and a fin 47c made up on said cover 47. Furthermore, a circular hydraulic actuator 75 is located at an diameter side of said fin 47c of said cover 47, and a return spring 76 is located at an inner side of said fin 47c of said cover 47. Said differential 13 has a gear unit 82 and a ring gear mount case 83. Said ring gear mount case 83 fixes a ring gear 85 meshing said differential drive gear 66, supports a differential pinion 86 of said differential gear unit 82 and makes up a differential carrier. Said differential gear unit 82 has right and left side gears 84r, 84l meshing said differential pinion 86; said side gears 84r, 84l is connected to right and left front axles 87r, 87l.

Due to the structure of this embodiment, the rotation of said engine crank shaft 30 is transmitted to said first axle 6 through said torque converter 20 or said lock up clutch 29; said rotation is shifted at required moment by said main transmission mechanism 5 and, further, said rotation is transmitted to said sub transmission mechanism 9 through said counter drive gear 11 and said counter driven gear 12. And said rotation is shifted by said sub transmission mechanism 9 at required moment and transmitted to said front axles 87, 87r through said differential 13. At this time, each control component $C_1$, $C_2$, $B_1$, $B_2$, $B_3$, $F_1$, $F_2$ of said main transmissions mechanism 5 and each control component $C_3$, $B_4$, $B_5$, $B_6$, $F_3$, $F_4$ of said sub transmission mechanism 9 operate as shown in FIG. 7. In said FIG. 7 a circle mark (O) is to mean function or brake application, clutch connection and one-way clutch connection; a triangle mark (Δ) is to mean function at coasting. The above is to mean that a first speed of said automatic transmission $U_1$ is obtained by the combination of a first speed of said main transmission mechanism 5 and first speed of said sub transmission mechanism 9; a second speed of said automatic transmission $U_1$ is obtained by the combination of a first speed of said automatic transmission 5 and a second speed of said sub transmission mechanism 9. Further, a third speed of said automatic transmission $U_1$ is obtained by the combination of a second speed of said main transmission mechanism 5 and a second speed of said sub transmission mechanism 9; a second speed of said main transmission mechanism 5 and a third speed of said sub transmission mechanism 9 makes a fourth speed as a whole; a third speed of said main transmission mechanism 5 and a third speed of said sub transmission mechanism 9 make a fifth speed as a whole.

For the combination of said main transmission mechanism 5 and said sub transmission mechanism 9, other combinations, not limited to the above explained, are also available.

The embodiment of a second invention is explained below:

In addition to the first embodiment, an explanation on an automatic transmission $U_2$ having forward six speed is given. In this case, the explanation is given to said clutch portion 37 because other portions are the same as those of the first invention.

Said automatic transmission $U_2$ has a main transmission mechansim 5' having four forward speeds and a clutch portion 37' which is located at the top edge of said main transmission mechanism 5' and covered by said transaxle cover 47. In said clutch portion 37', said first clutch $C_1$ and said fourth clutch $C_0$ are located axially side by side, and said fifth one-way clutch $F_0$ is located between siad return spring 53 and said flange 39b. Consequently, said main transmission mechanism 5' is axially longer than said main transmission mechanism 5 for the length of said fourth clutch $C_0$ because said fourth clutch $C_0$ and said fourth one-way clutch $F_0$ occupy different position along diameter direction. Said first clutch $C_1$ and said second clutch $C_2$, said hydraulic actuators 49, 50 are all the same as those of said main transmission mechanism 5. However difference are that said ring gear $R_1$ meshes said first clutch $C_1$ with its expanded part, a fin of said flange 39b meshing said second clutch $C_2$ is expanded axially, said flange 6a connected on the top edge of said first axle 6 is long axially; consequently, said transaxle cover 47 is a little longer than said main transmission mechanism 5.

An outer circumference of said flange 6a is enclosed by movable member 93 which makes up a hydraulic actuator of said fourth clutch $C_0$, and said piston 93b of said movable member 93 is located along an outer surface of said flange 6a. The top edge of said movable member 93 is said arm 93a expanding toward an outer diameter side of said flange 6a; at the edge of said arm 93a, a link-like rug 99 is bent toward inside. A return spring 100 is installed between a base of said rug 99 and a circular expanding portion 6d of said flange 6a. A built up portion of said flange 6a has an oil path c for an oil chamber 96 of said fourth clutch $C_0$, and oil pressure is applied to said oil chamber 96 from a circular fin portion 47a made on said cover 47 through an oil path of a boss 6c. Said ring gear $R_2$ of said dual planetary gear unit 2 has a spline on its outer surface, with which said third brake $B_3$ meshes and a connecting member 101 having step-like shafts is connected, and further, a spline made on an outer surface of the small diameter portion of said connecting member 101 is connected to said third clutch $C_0$.

In addition to the above explanation, the motions of said main transmission mechansim $U_2$ having four forward speeds is explained.

The rotation of said first axle 6, through said torque converter 20 or said lock up clutch 29, is transmitted to said main transmission mechanism 5' where said rotation is shifted to four forward speed or one reverse speed; further, said shifted rotation is also shifted to three forward speeds in said sub transmission mechansim 9; said shifted speeds of said main and sub transmission mechanisms 5', 9 are combined so that six forward speeds are obtained; said rotation is transmitted to said front axles 87l, 87r through said differential 13. At this time, each control component of said main transmission 5' such as $C_1$, $C_2$, $C_0$, $B_1$, $B_2$, $B_3$, $F_1$, $F_2$, $F_0$ and each control component of said sub transmission mechanism 9 such as $C_3$, $B_4$, $B_5$, $B_6$, $F_3$, $F_4$ works as shown in FIG. 9. In said figure a circle mark (O) means function such as application of brake, connection of clutch and connection of one-way clutch; a triangle mark (Δ) means function during coasting. Due to the above a first speed of said main transmission mechanism 5' and first speed of said sub transmission mechanism 9 make a first speed of said automatic transmission $U_2$; a first speed of said main transmission mechanism 5' and a second speed of said sub transmission mechanism 9 make a second speed of said transmission mechanism $U_2$; a second speed of said transmission mechanism 5' and a second speed of said transmission mechanism 9' make a third speed of said transmission mechanism $U_2$; a second speed of said transmission mechanism 5' and a third speed of said sub transmission mechanism make a fourth speed of said transmission mechanism $U_2$; a third speed of said main transmission mechanism 5' and a third speed of said sub transmission mechanism 9 make a fifth speed of said transmission $U_2$. Furthermore, in addition to the above, a fourth speed of said transmission mechanism 5' and a third speed of said sub transmission mechanism 9 make a sixth speed bringing an over drive of said transmission $U_2$.

A partially modified four speed main transmission mechanism 5' is shown in FIG. 10.

Figure 8:
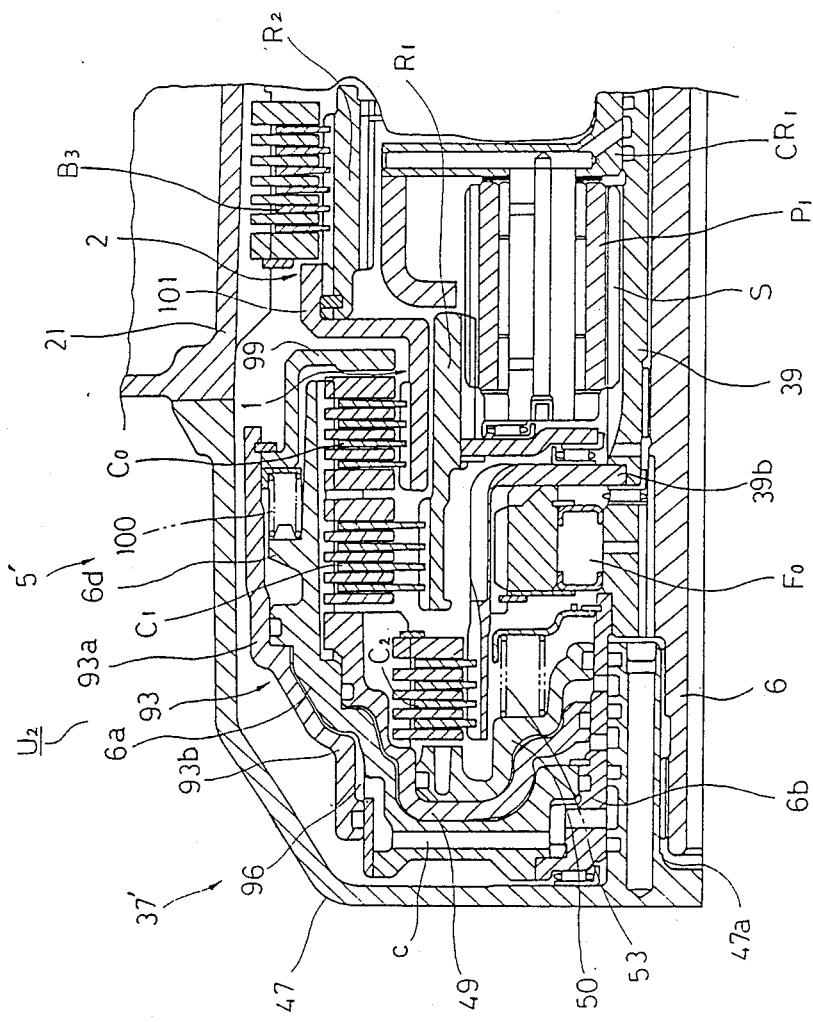
FIG. 8 is a cross sectional view of the clutch portion in the embodiment of the second invention.

In said main transmission mechanism 5', the actuator area for said clutch $C_0$ is different from that of shown in previous FIG. 8. On said boss 6c connected to said first axle 6, a first flange 6a' and a second flange 6a'' are fixed outside said hydraulic actuators 49, 50; a drum 105 is installed on a circumference of said flanges 6a' and 6a''. Said drum 105 has a hole 105a and a comb like groove 105b which is connected to said hydraulic actuator 49, plates of said first clutch $C_1$ and plates of said fourth clutch $C_0$. A circular cylinder portion made by said flanges 6a, 6a'' and drum 105 encloses a piston member 106 making up a hydraulic actuator of said clutch $C_0$; a connecting member 107 runs from said piston member 106 through said hole 105a. At the top edge of said connecting member 107, a pressure plate 109 is installed vertically; said fourth clutch $C_0$ is controlled, and oil is supplied to said actuator 106 from a slit c between said flanges 6a, 6a''.

With reference to the combination of said main transmission mechanisms 5, 5' and said sub transmission mechanism 9, it can be said that other combinations are of course available.

Said automatic transmission $U_1$ having said three speed main transmission mechanism and said automatic transmission $U_2$ having said four speed main transmission $U_2$ are made up of common parts including said transaxle case 21; these transmissions $U_1$ and $U_2$ can be manufactured in the same manufacturing line: both automatic transmission mechanisms can be easily manufactured by slight modification of said transaxle case 47 and said clutch portion 37.

As explained, due to the present invention, said main transmission mechanism 5 or 5' is installed on said first axle 6, and said sub transmission mechanism 9 is installed on said second axle 10, so that the automatic transmission mechanism of the present invention has multiple speeds such as forward more than five speeds; however, as said main transmission mechanism 5 or 5' comprises said single planetary gear unit 1 and said dual planetary gear unit 2, said sun gears S are connected to one another, and said carrier $CR_1$ are connected to one another, the structure can be shortened axially, a cross section of said transmission $U_1$ and $U_2$ connecting with said sub transmission mechanism 9 can be square shape, so that this copes with the space limitation due to "front engine front-drive" tendency, etc., and other mounting problems on the car.

Furthermore, by only adding said fourth clutch $C_0$ (and said fifth one-way clutch $F_0$), said three speed automatic transmission mechanism 5 is changed to said four speed automatic transmission mechanism 5', manufacturing facilities and parts are utilized in common, so that this copes with wide variation of car kinds and types without cost increase.

In forward running, as driving force is input from said input member 6a to said ring gears $R_1$ and $R_2$ of said automatic transmission mechanisms 5 and 5', tangential force applied to the cogs can be minimized; by not increasing the thickness of the cogs and the volume of restraining means, input allowable torque can be increased; this can cope with recent high horse power tendency.

Three clutchs $C_1$, $C_2$, $C_0$ and restraining means, i.e. three brakes $B_1$, $B_2$, $B_3$, three one-way clutch $F_1$, $F_2$, $F_0$ can make up said four speed automatic transmission mechanism 5, and said forward four speed main transmission mechanism 5 and said three speed sub transmission mechanism 9 make said multiple speed automatic transmission $U_2$ having more than six speed with precise gear ratio.

By installing said first to fourth one-way clutch $F_1$, $F_2$, $F_3$, $F_4$ and said fifth one-way clutch $F_0$ (in case of four speed main shifting mechanism 5), all transmission are performed through a one-way clutch, so that time is given to the motion timing, and the motion timing of clutches and brakes can be easy and with sure; shifting can be smooth by eliminating shift shock of gear change.

Furthermore, in said automatic transmissions 5 and 5' said sun gear S of said single planetary gear unit 1, said dual planetary gear unit 2 are connected to one another; said carrier pinion of said single planetary gear unit 1 and one carrier pinion of said dual planetary gear unit 2 are connected as said long pinion $P_1$, so that processing ability and productivity are enhanced, so, further minimizing of the mechanism is obtained.

What is claimed is:

1. An automatic transmission having a first axle for constituting an input member, and a second axle for constituting an output member and extending parallel to the first axle, comprising:

a main transmission mechanism situated on the first axle, said main transmission mechanism including a single planetary gear unit having a sun gear, a ring gear, a carrier pinion, and a carrier for supporting the carrier pinion, and a dual planetary gear unit having a sun gear, a ring gear, first and second carrier pinions, and a carrier for supporting the first and second carrier pinions of the dual planetary gear unit, said carriers of the single and dual planetary gear units being integrally connected together, and said sun gears of the single and dual planetary gear units being integrally connected together, a first clutch for selectively connecting and disconnecting between the input member and the ring gear of the single planetary gear unit, a second clutch for selectively connecting and disconnecting between the input member and the sun gears of the single and dual planetary gear units integrally connected together, first restraining means connected to the sun gears for selectively restraining movement of the sun gears, second restraining means connected to the ring gear of the dual planetary gear unit for selectively restraining movement of the same, a counter drive gear connected to the carriers integrally connected together and situated in the center of the main transmission mechanism, a sub transmission mechanism situated on the second axle, said sub transmission mechanism including a first single planetary gear unit and a second single planetary gear unit, said first and second single planetary gear units having sun gears, ring gears, carrier pinions and carriers for supporting the carrier pinions, respectively, said sun gears of the first and second single planetary gear units being integrally connected together, and said carrier of the first single planetary gear unit being connected to said ring gear of the second single planetary gear unit and to the second axle constituting the output member of the carrier, a third clutch for selectively connecting and disconnecting between the sun gears of the first and second single planetary gear units and the carrier of the second single planetary gear unit, third restraining means connected to the carrier of the second single planetary gear unit for selectively restraining movement of the same, fourth restraining means connected to the sun gears of the first and second single planetary gear units for selectively restraining movement of the same, a counter driven gear connected to the ring gear of the first single planetary gear unit and engaging said counter drive gear to transfer power from the main transmission mechanism to the sub transmission mechanism, an output gear fixed to the second axle, said output gear being located at a side of the counter driven gear opposite to the first and second single planetary gear units, a transaxle case for receiving the main and sub transmission mechanisms, and a rear cover fixed to a rear of the transaxle case so that an axial length of said sub transmission mechanism and the output gear located on the second axle is within an axial length of the main transmission mechanism, and said third clutch and third and fourth restraining means are enclosed in the transaxle case and covered by the rear cover.

2. An automatic transmission according to claim 1, wherein said first restraining means comprises a first brake for directly restraining rotation of the sun gears and a second brake for restraining rotation of the sun gears in one direction by means of a first one-way clutch, and the second restraining means comprises a third brake for directly restraining rotation of the ring gear and a second one-way clutch for restraining rotation of the ring gear in one direction.

3. An automatic transmission according to claim 1, wherein said third restraining means comprises a fourth brake, which is a band brake, and a third one-way clutch for restraining rotation of the carrier of the second single planetary gear unit in one direction, and said fourth restraining means comprises a fifth brake for directly restraining rotation of the sun gears, which is a band brake, and a sixth brake for restraining rotation of the sun gears of the first and second single planetary gear units in one direction by means of a fourth one-way clutch.

4. An automatic transmission according to claim 1, wherein said first axle is a single shaft.

5. An automatic transmission according to claim 1, wherein said second axle is a single shaft.

6. An automatic transmission according to claim 1, further comprising a flange connected to a rear end of the first axle, said first and second clutches being situated inside the flange.

7. An automatic transmission according to claim 1, further comprising a torque converter situated at a front end of the first axle, a third axle situated parallel to the first and second axles, and a differential mechanism connected to the third axle and having a ring gear engaging the output gear fixed to the second axle.

8. An automatic transmission according to claim 1, wherein said first restraining means are situated at a side opposite to the single and dual planetary gear units relative to the counter drive gear.

9. An automatic transmission having a first axle for constituting an input member, and a second axle for constituting an output member and extending parallel to the first axle, comprising:

a main transmission mechanism situated on the first axle, said main transmission mechanism including a single planetary gear unit having a sun gear, a ring gear, a carrier pinion, and a carrier for supporting the carrier pinion, and a dual planetary gear unit having a sun gear, a ring gear, first and second carrier pinions, and a carrier for supporting the first and second carrier pinions of the dual planetary gear unit, said carriers of the single and dual planetary gear units being integrally connected together, and said sun gears of the single and dual planetary gear units being integrally connected together, a first clutch for selectively connecting and disconnecting between the input member and the ring gear of the single planetary gear unit, a second clutch for selectively connecting and disconnecting between the input member and the sun gears of the single and dual planetary gear units integrally connected together, a fourth clutch selectively connecting and disconnecting between the input member and the ring gear of the dual planetary gear unit, first restraining means connected to the sun gears for selectively restraining movement of the sun gears, second restraining means connected to the ring gear of the dual planetary gear unit for selectively restraining movement of the same, a counter drive gear connected to the carriers integrally connected together and situated in the center of the main transmission mechanism, a sub transmission mechanism situated on the second axle, said sub transmission mechanism including a first single planetary gear unit and a second single planetary gear unit, said first and second single planetary gear units having sun gears, ring gears, carrier pinions and carriers for supporting the carrier pinions, respectively, said sun gears of the first and second single planetary gear units being integrally connected together, and said carrier of the first single planetary gear unit being connected to said ring gear of the second single planetary gear unit and to the second axle constituting the output member of the carrier, a third clutch for selectively connecting and disconnecting between the sun gears of the first and second single planetary gear units and the carrier of the second single planetary gear unit, third restraining means connected to the carrier of the second single planetary gear unit for selectively restraining movement of the same, fourth restraining means connected to sun gears of the first and second single planetary gear units for selectively restraining movement of the same, a counter driven gear connected to the ring gear of the first single planetary gear unit and engaging said counter drive gear to transfer power from the main transmission mechanism to the sub transmission mechanism, an output gear fixed to the second axle, said output gear being located at a side of the counter driven gear opposite to the first and second single planetary gear units, a transaxle case for receiving the main and sub transmission mechanisms, and a rear cover fixed to a rear of the transaxle case so that an axial length of said sub transmission mechanism and the output gear located on the second axle is within an axial length of the main transmission mechanism, and said third clutch and third and fourth restraining means are enclosed in the transaxle case and covered by the rear cover.

10. An automatic transmission according to claim 9, wherein said first restraining means comprises a first brake for directly restraining rotation of the sun gears and a second brake for restraining rotation of the sun gears in one direction by means of a first one-way clutch, and the second restraining means comprises a third brake for directly restraining rotation of the ring gear and a second one-way clutch for restraining rotation of the ring gear in one direction, said transmission further comprising a fifth one-way clutch situated between said input member and the sun gears of the single and dual planetary gear units to prevent rotation of the sun gears beyond the rotation of the input member.

11. An automatic transmission according to claim 9, wherein said third restraining means comprises a fourth brake, which is a band brake, and a third one-way clutch for restraining rotation of the carrier of the second single planetary gear unit in one direction, and said fourth restraining means comprises a fifth brake for directly restraining rotation of the sun gears, which is a band brake, and a sixth brake for restraining rotation of the sun gears of the first and second single planetary gear units in one direction by means of a fourth one-way clutch.

12. An automatic transmission according to claim 9, wherein said first axle is a single shaft.

13. An automatic transmission according to claim 9, wherein said second axle is a single shaft.

14. An automatic transmission according to claim 9, further comprising a flange connected to a rear end of the first axle, said first and second clutches being situated inside the flange.

15. An automatic transmission according to claim 9, further comprising a torque converter situated at a front end of the first axle, a third axle situated parallel to the first and second axles, and a differential mechanism connected to the third axle and having a ring gear engaging the output gear fixed to the second axle.

16. An automatic transmission according to claim 9, wherein said first restraining means are situated at a side opposite to the single and dual planetary gear units relative to the counter drive gear.

17. An automatic transmission according to claim 9, wherein said fourth clutch is situated within the rear cover.

* * * * *